United States Patent [19]

Mohr

[11] Patent Number: 4,532,167
[45] Date of Patent: Jul. 30, 1985

[54] READABLE GOODS-MARKING SYSTEM FOR TEXTILE PROCESSING

[75] Inventor: Peter R. Mohr, Remseck, Fed. Rep. of Germany

[73] Assignee: Erhardt & Leimer GmbH, Augsburg, Fed. Rep. of Germany

[21] Appl. No.: 493,639

[22] Filed: May 11, 1983

[30] Foreign Application Priority Data

May 11, 1982 [DE] Fed. Rep. of Germany ....... 3217600

[51] Int. Cl.³ .............................................. B32B 3/16
[52] U.S. Cl. ....................................... 428/78; 40/626; 40/630; 428/138; 428/200; 428/204; 428/207; 428/228
[58] Field of Search .................... 283/79, 81, 93, 107, 283/109, 78; 428/200, 228, 246, 401, 542.6, 543, 914, 204, 317.5, 138, 207; 40/626, 630, 309

[56] References Cited

U.S. PATENT DOCUMENTS

| Re. 28,542 | 9/1975 | Meyer | 428/200 |
| 2,734,840 | 2/1956 | Kane | 428/427 |
| 3,359,127 | 12/1967 | Meyer et al. | 428/200 |
| 3,956,558 | 5/1976 | Blanco et al. | 428/204 |
| 3,992,559 | 11/1976 | Day et al. | 428/200 |
| 4,111,734 | 9/1978 | Rosenfeld | 428/204 |
| 4,159,586 | 7/1979 | Blum | 283/81 |
| 4,400,419 | 8/1983 | Laczynski | 428/914 |

FOREIGN PATENT DOCUMENTS 19975  4/1956  Fed. Rep. of Germany .

Primary Examiner—George F. Lesmes
Assistant Examiner—William M. Atkinson
Attorney, Agent, or Firm—Karl F. Ross; Herbert Dubno

[57] ABSTRACT

A marking system for a textile web in production comprises a heat-, water-, and chemical-resistant substrate layer having a front and back face, pigment forming indicia carried on the front face of the layer, and a heat-, water-, and chemical-resistant cover layer formed of a transparent and flexible synthetic resin and embedding the substrate layer and pigment at least over the front face thereof. The cover layer is bonded to the web. The cover layer secures the indicia on the substrate layer and the latter on the web. The pigment is printed on the front face of the substrate which itself is made of glass fibers. The substrate layer is provided on its rear face with a layer bonding it to the web. The bonding layer in turn can be an adhesive, or can be of the same water-, chemical-, and heat-resistant material as the cover layer. In the latter case it is welded to the web, normally in the same operation with which the cover layer overlying the label and indicia is bonded by heat to same and to the web therearound.

7 Claims, 3 Drawing Figures

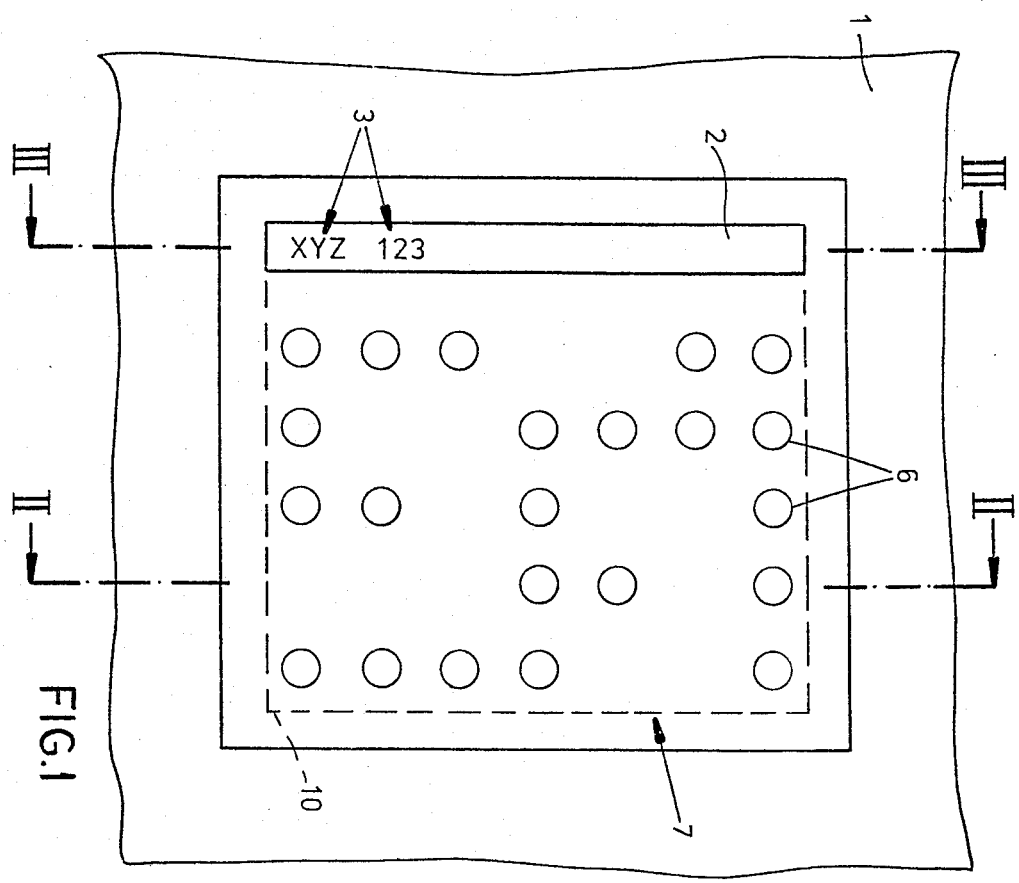
FIG.1
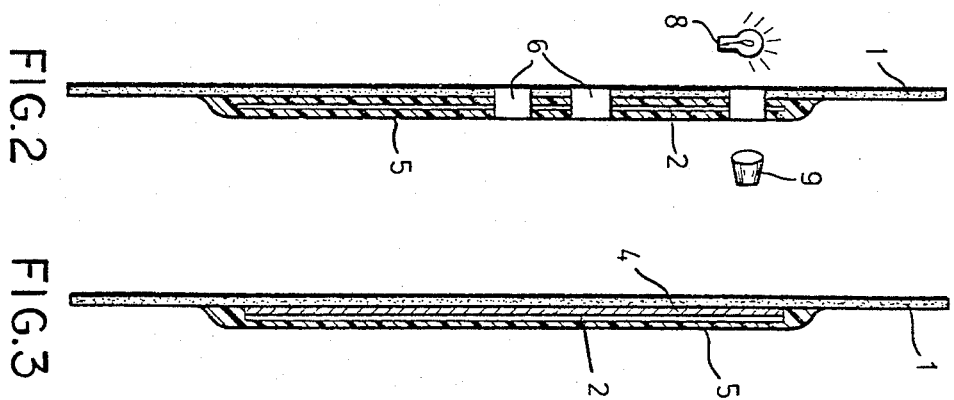
FIG.2
FIG.3

READABLE GOODS-MARKING SYSTEM FOR TEXTILE PROCESSING

FIELD OF THE INVENTION

The present invention relates to the marking of textile goods during processing. More particularly this invention concerns such marking which is carried out normally after weaving or other initial fabrication process and before further treatment of a textile web.

BACKGROUND OF THE INVENTION

A textile web, whether a woven or knitted cloth or some kind of felt, must be identified immediately after formation and before it is subjected to various further treatment steps so it can be kept track of. The problem with doing so is that the treatments through which the goods are put are quite aggressive. The web is often heated in water to temperatures near boiling for preshrinking and dyeing, and is sometimes steamed and thereby heated with vapor hotter than 100° C. It can be dried in air temperatures as great as 250° C. In addition the goods are invariably soaked thoroughly, and normally in chemically active solutions containing acids, bleach, dyes, surface-active agents such as detergents, and so on. Hence marking goods so the marking remains legible is quite a problem.

Accordingly German patent application 19,975 filed Mar. 26, 1954 by Erwin Menhofer proposes a system where the marking is punched in the selvage. This is done by an array of needles that are pierced through the goods at a marking station provided as far upstream in the production line as possible, and even movable in the production direction to allow the marking to be carried out as the goods move.

The marking produced by such an arrangement is not, even at its best when fresh, highly legible. Furthermore if the material shrinks or is stretched considerably the marking loses even more legibility, thereby further reducing its effectiveness.

Modern procedures for tickets, tokens, and credit cards use markings readable by automatic apparatus. Such systems are described in German patent document 2,338,561 filed by V. Dolch with a claim to the priority of U.S. application Ser. No. 284,753 filed Aug. 30, 1972, U.S. Pat. Nos. 2,265,182, and 2,257,021 to P. Hengstler et al. These arrangements use either OCR-type characters and/or numerals, throughgoing holes or perforations, or bumps, arranged is very specifically dimensioned arrays on normally rigid substrates. Unfortunately there has been no such system provided for textile processes, as the goods change shape too much for the marking to remain readable, even though it is known to stiffen textiles by iron-in foils such as described in German Pat. No. 1,635,072 of H. Mayer et al and German patent document 1,435,458 of L. Hartman et al.

OBJECTS OF THE INVENTION

It is therefore an object of the present invention to provide an improved system for marking a textile web in production.

Another object is the provision of such a system for marking a textile web in production which overcomes the above-given disadvantages, that is which remains legible during the entire treatment of the web.

A further object is the provision of a marking system which can be entered relatively easily right on the web before or during treatment, but which still can be machine read.

SUMMARY OF THE INVENTION

These objects are attained according to the instant invention in a marking system for a textile web in production which comprises a heat-, water-, and chemical-resistant substrate layer having a front and back face, pigment forming indicia carried on the front face of the layer, and a heat-, water-, and chemical-resistant cover layer formed of a transparent and flexible synthetic resin and embedding the substrate layer and pigment at least over the front face thereof. The cover layer is bonded to the web.

With this system therefore the cover layer secures the indicia on the substrate layer and the latter on the web. This substrate layer can be formed as a standard label. Normally according to the invention it is thin compared to the cover layer and the pigment is printed on its front face so that the system does not stand up appreciably from the web and can pass readily between rollers and the like that transport it. Such an arrangement can be counted on to be dimensionally stable and to remain legible even after the various aggressive treatments that the web is subjected to.

In accordance with this invention the substrate layer is formed of glass fibers. Thus it has limited flexibility, but is dimensionally very stable and will be unaffected by most thermal and chemical processes. Such glass fibers are a poor base for the indicia pigment, but the overlying cover layer secures this indicia in place so such poor bonding is irrelevant.

The front face of the substrate layer is as smooth as possible to make it easy to print the indicia thereon. To prevent the substrate layer from shifting or creeping on the web underneath the cover layer, a problem particularly likely to present itself with a glass-fiber substrate, this layer is provided on its rear face with a layer bonding it to the web. The bonding layer in turn can be an adhesive, or can be of the same water-, chemical-, and heat-resistant material as the cover layer. In the latter case it is welded to the web, normally in the same operation with which the cover layer overlying the label and indicia is bonded to same and to the web therearound.

The cover layer according to this invention stiffens the web at the substrate layer. This makes the indicia less susceptible to spoiling from creasing, kinking, or otherwise deforming the web carrying the marking system of this invention.

In this system the cover layer can extend adjacent the substrate layer over a field and the web and cover layer are formed in the field with an array of throughgoing holes. For further stiffening in this region the substrate layer extends into the field. These holes can be read relatively easily by known devices normally applied to ticketing or harder workpieces.

When in such a system the substrate layer is formed of dimensionally very stable glass fibers the cover layer is fused with the web.

The cover layer is itself formed at least partially of a polymer. In addition the bonding layer on the rear face of the web is a fused foil of polypropylene, either constituted as a sheet or formed of fibers.

DESCRIPTION OF THE DRAWING

The above and other features and advantages will become more readily apparent from the following, reference being made to the accompanying drawing in which:

FIG. 1 is a front view of the system of this invention;

FIG. 2 is a partly schematic sectional view taken along line II—II of FIG. 1 with the relative thicknesses exaggerated for clarity of view; and FIG. 3 is a section taken along line III—III of FIG. 2 and with the sections also not strictly to scale.

SPECIFIC DESCRIPTION

As seen in FIGS. 1-3 a textile web 1, which may be woven, knitted, or felted, carries a substrate layer or label 2 of rectangular shape and formed of a very thin knitted, woven, or felted piece of goods formed of glass fibers. This label 2 in turn carries pigment indicia 3 on its front face, that is its face turned away from the web 1, and here forming three letters and three numerals.

The back face of the label 2 is provided with a bonding layer 4 that secures it to the web 1, and the front face of the label 2 with its indicia 3 is covered by a transparent cover layer 5 which also extends somewhat beyond the periphery or bounds of the label 2, as well as over a rectangular field 7 adjacent this label 2. In the field 7 the cover layer 5 and web 1 are formed with a coded array of throughgoing identification holes 6 readable by combinations of a light source 8 and photocell 9 shown schematically in FIG. 2. The label 2 can extend over this field 7 as indicated by dashed line 10.

The label 2 is resistant to attack by acids, surface-active agents, bleaches and does not take dye so that it is unaffected by any of the liquid attacks it will be subject to as the web 1 is further processed. In addition it can withstand temperatures of 10° C.–250° C. without substantial deformation. The label 2 further does not absorb any or any appreciable amount of liquid and does not swell or shrink appreciably when wetted and dried. When made of glass fibers as described above it fulfills all these requirements, plus has sufficient rigidity to stabilize the web 1 underneath it. Instead of glass fibers it is possible to use carbon, metallic, or metal-alloy fibers. Even a thin metal sheet or foil could be used for the label 2.

The pigment indicia 3 must also be stable in the above-given temperature range of 10° to 250° C. and must resist attack by the various bleaches, dyes, and the like it will be subjected to as the web 1 is processed. A binder can be mixed with the pigment before it is applied so it sticks properly, whereupon the binder evaporates to leave the indicia 3 on the label 2. Organic or inorganic compounds, mineral products, metals, metal alloys, and metallic compounds such as oxides can be used to make up the pigment 3, as well as any workable mixture of these substances.

The cover layer 5 serves to cover and protect the label 2 and indicia 3 and to dimensionally stabilize the web 1 underneath the label 2. This layer 5 is formed, as mentioned above, of a flexible synthetic resin, one that retains its transparency and dimensional stability within the temperature ranges and in the presence of the substances recited immediately above for the lable 2. A thermoplastic resin having a melting point above 160° C. such as polypropylene, a polypropylene copolymer, or another polymer can be used. It can be supplied to the user as a precut foil that is made to bond to the label 2, indicia 3, and web 1 by ironing.

The layer 4 that lies underneath the label 2 is of the same material as the cover layer 5. Normally it is supplied bonded to the label 2, so that the user enters the desired indicia 3 on the label 2, then sets it on the web 1, covers it with the layer 5, and then bonds the layers 4 and 5 and label 2 together by applying heat to it. Thereupon the holes 6 are punched in the necessary array.

The cover layer 5 stabilizes the web 1 dimensionally so that it lies flat in the region it is applied to. In addition it prevents the various stages of the treatment process from deforming the web in the field 7 so greatly that the holes 6 are no longer readable by the automatic reading machine having the parts 8 and 9. Further extending the label 2 and backing layer 4 into the field 7 serve for even further stiffening as desired, while surely preventing sufficient deformation in this field 7 to make the array of holes 6 unreadable.

Once the goods are processed the end carrying the marking system can be trimmed off and discarded. With this system it is not inconceivable that it will so well withstand the various treatments that it can be left in place to identify the goods, manufacturer, and lot number to the buyer.

I claim:

1. In combination with a textile web in production, a marking system comprising:

a heat-, water-, and chemical-resistant substrate layer having a front and back face;

pigment forming indicia carried on the front face of said substrate layer; and a heat-, water-, and chemical-resistant cover layer formed of a transparent and flexible synthetic resin, and embedding the substrate layer and pigment over the front face and back face thereof, said cover layer being bonded to the web around the substrate layer, at the back face of the substrate layer, and at a field on the web immediately adjacent the substrate layer, and stiffening the web at the substrate layer and at the field thereadjacent, the web and cover layer being formed in the field with a readable array of holes.

2. The marking system defined in claim 1 wherein the substrate layer is thin compared to the cover layer of the substrate layer.

3. The marking system defined in claim 1 wherein the substrate layer is provided on its back face with a layer bonding it to the web.

4. The marking system defined in claim 1 wherein the bonding layer is welded to the web.

5. In combination with a textile web in production, a marking system comprising:

a heat-, water-, and chemical-resistant substrate layer made of glass fibers and having a front and back face;

pigment forming indicia carried on the front face of said substrate layer; and a heat-, water-, and chemical-resistant cover layer formed of a transparent and flexible synthetic resin, and embedding the substrate layer and pigment over the front face thereof, said cover layer being bonded to the web around the substrate layer and at a field on the web immediately adjacent the substrate layer, and stiffening the web at the substrate layer and at the field thereadjacent, the web and cover layer being formed in the field with a readable array of holes.

6. The marking system defined in claim 5 wherein the cover layer is fused with the web.

7. The marking system defined in claim 6 wherein the cover layer is formed at least partially of a polymer.

* * * * *